United States Patent [19]

Olschewski et al.

[11] 4,202,558
[45] May 13, 1980

[54] SUPPORT BODY FOR ROLLERS OF SKATING DEVICES

[75] Inventors: Armin Olschewski, Schweinfurt; Manfred Brandenstein, Aschfeld; Manfred Krug, Schweinfurt; Horst Martin, Gochsheim, all of Fed. Rep. of Germany

[73] Assignee: SKF Kugellagerfabriken GmbH, Schweinfurt, Fed. Rep. of Germany

[21] Appl. No.: 879,742

[22] Filed: Feb. 21, 1978

[30] Foreign Application Priority Data

Mar. 26, 1977 [DE] Fed. Rep. of Germany ....... 7709615

[51] Int. Cl.² ............................................. A63C 17/02
[52] U.S. Cl. ........................... 280/11.28; 280/87.04 A
[58] Field of Search ............... 280/11.28, 11.27, 11.19, 280/11.12, 87.04 A, 87.04 R, 11.1 BT, 11.11 R

[56] References Cited

U.S. PATENT DOCUMENTS

| | | | |
|---|---|---|---|
| 1,034,625 | 8/1912 | Kohler et al. | 280/11.28 |
| 2,033,334 | 3/1936 | Goosman | 280/11.28 |
| 3,355,184 | 11/1967 | Green | 280/11.19 |
| 3,649,038 | 3/1972 | Huckenbeck | 280/11.28 |
| 3,870,324 | 3/1975 | Balstad | 280/11.28 |
| 4,071,256 | 1/1978 | Kimmell | 280/11.28 |

*Primary Examiner*—David M. Mitchell
*Attorney, Agent, or Firm*—Daniel M. Rosen

[57] ABSTRACT

An elastic supporting body for each roller shaft and rollers of a skateboard, skates or the like, each supporting body including a pin extending downwardly at an angle from the mounting plate, with the remote end of the pin rigidly secured to the roller shaft, and thereby stiffening the supporting body along the axis of the pin, while still allowing the roller shaft to twist for altering the steering direction with weight shifts of the user.

13 Claims, 6 Drawing Figures

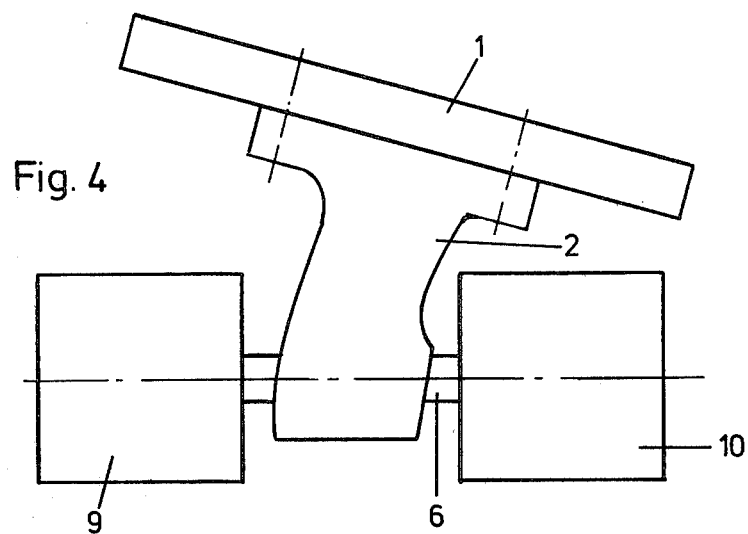
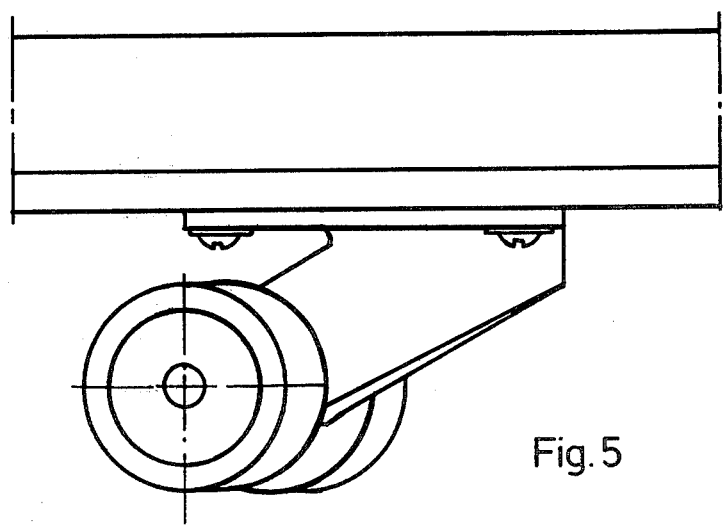

SUPPORT BODY FOR ROLLERS OF SKATING DEVICES

BACKGROUND OF THE INVENTION

The present invention relates to a supporting body for the rollers of roller skates, skateboards or the like. Such supporting bodies are fastened to the soleplate or mounting plate, and each has a bore portion that accommodates the shaft of the roller.

There are known two-track steerable roller skates which have supporting bodies for the rollers that are made of plastic, accommodate each roller shaft in a bore, and are fastened to the soleplate. In these prior art designs, the supporting body, made of an elastic plastic, is provided with an articulatable zone in order to obtain steerability through the shifting of the body weight. These prior art designs have the drawback of being too unstable, that is to say, the roller shaft may be deflected in all directions. No defined force components are preimposed by the material of construction with its all-around elastic resilience. Satisfactory steering controlled by the body weight therefore cannot be secured.

The object of the present invention is to provide a supporting body which permits the rollers to be steered in a clearly definable direction.

SUMMARY OF THE INVENTION

In accordance with the present invention, the above-noted object is accomplished in that a pin rigidly connected to the roller shaft and made of a material of a stiffness greater than that of the supporting body, is disposed in the supporting body at an angle ($\alpha$) to a perpendicular through the plane of the soleplate or mounting plate. The pin is preferably a metal pin. In this supporting body the elastic properties of the supporting body are utilized to produce the steering motions based on a shifting of the user's body weight. Through the particular arrangement of the pin in this elastic supporting body, the resilience is limited in definite directions, that is to say, the supporting body is reinforced in a certain way. A precisely defined force component of the user's body weight is produced thereby, which positions the roller shaft in the desired direction.

The inclination of the relatively stiff pin relative to the perpendicular reference axis through the soleplate provides the "offset" necessary for a favorable change of direction; the pin is initially stressed to a greater or lesser extent in the plastic supporting body by the user's body weight before the user affects a turning weight shift. This makes it possible to secure optimum steering conditions for every user's body weight.

The supporting body may be injection-molded onto the pin together with the roller shaft; however, it is also possible to prefabricate the supporting body with the appropriate bores and to introduce the roller shaft with the pin subsequently.

To further change the frictional bracing effect of the pin on the supporting body, additional means such as threaded bolts or the like may be provided. By tightening the bolt to a greater or lesser extent, the frictional bracing by the pin is increased.

In some cases, and particularly when certain materials of construction are used for the supporting body, it may be advisable to provide in the supporting body, openings extending parallel to the roller shaft.

An exemplified embodiment of the present invention is shown in the accompanying drawings as follows.

BRIEF DESCRIPTION OF THE DRAWINGS

FIG. 4 is a front elevation of the loaded skateboard;

FIG. 5 is a side elevation of the loaded skateboard; and

DETAILED DESCRIPTION OF THE PREFERRED EMBODIMENT

Figure 1:
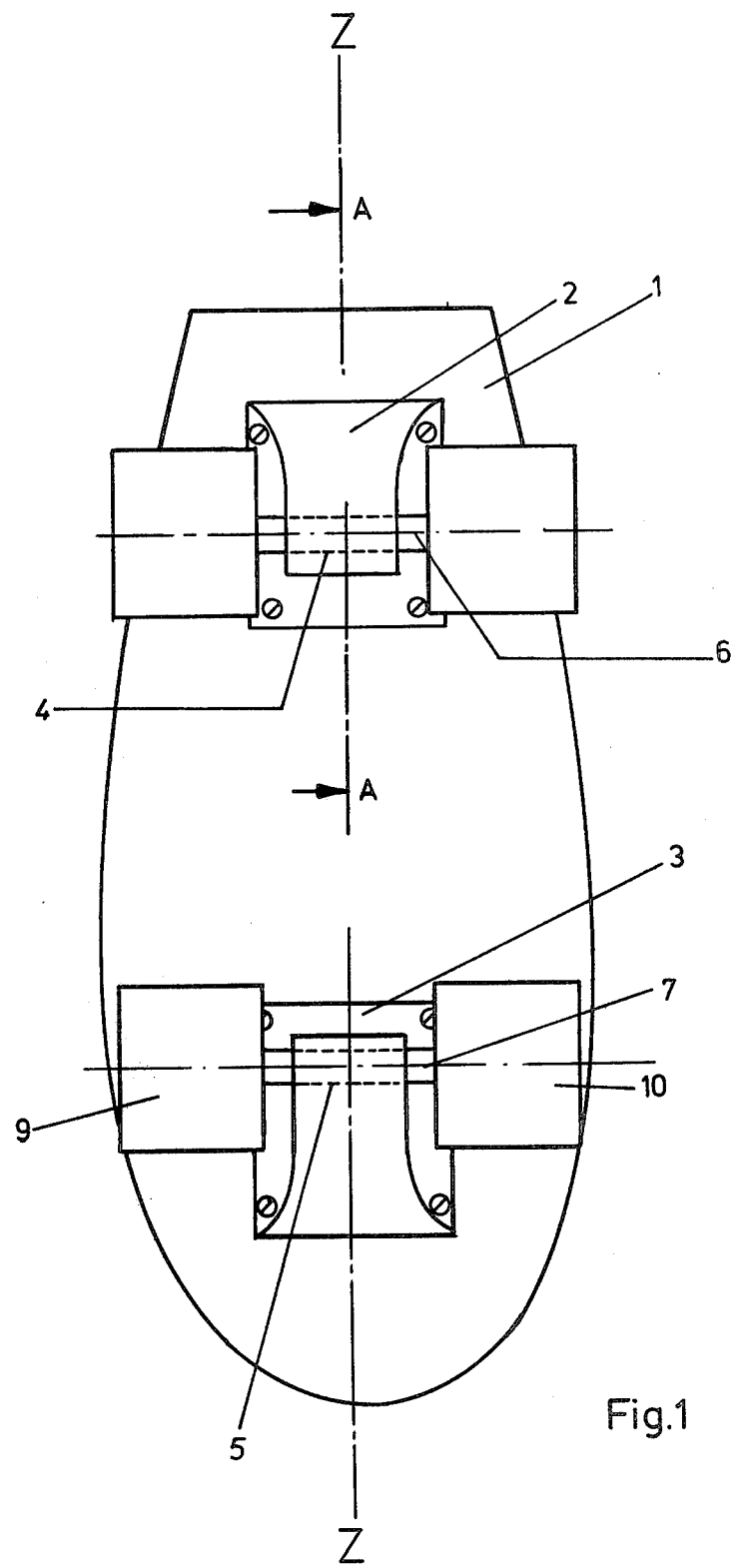
FIG. 1 is a bottom plan view of an unloaded skateboard.

The skateboard consists of a mounting plate 1 with a top surface and a longitudinal axis Z—Z. Beneath this plate are fastened two supporting bodies 2 and 3, which are made of plastic, are spaced from each other, and have bores 4 and 5, respectively. In these bores are roller shafts 6 and 7, with rollers 9 and 10 at the end of each shaft.

Within each supporting body 2, 3 (also called support members) in a radial plane extending along the roller shaft, is a bore 11 in which a pin 12, preferably made of metal, and rigidly connected to the shaft 6, 7 is disposed. This pin 12 and the bore 11 are inclined at an angle $\alpha$ relative to a reference axis X—X perpendicular to the plane of the mounting plate 1. The pin extends from the roller shaft at the lower part of the support member through the central part to the upper part thereof.

Figure 2:
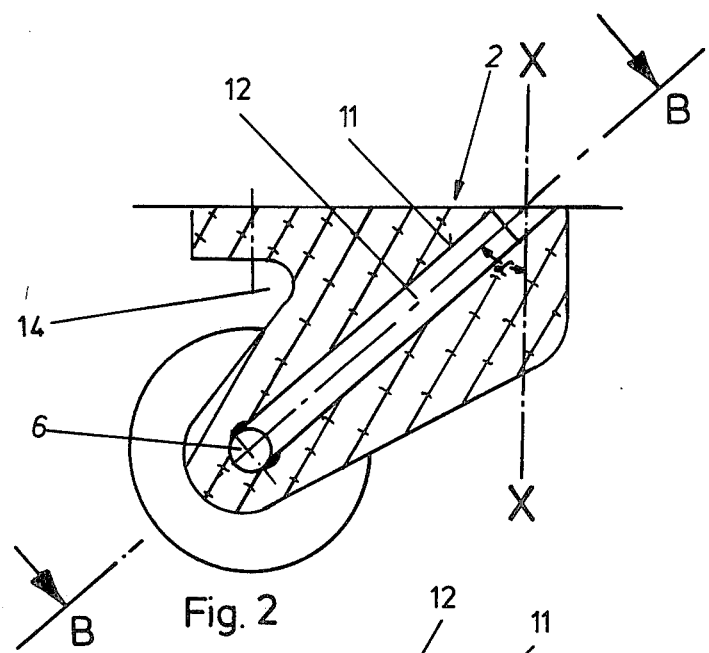
FIG. 2 is a sectional view of the supporting body of the skateboard taken along the plane A—A in FIG. 1.
Figure 3:
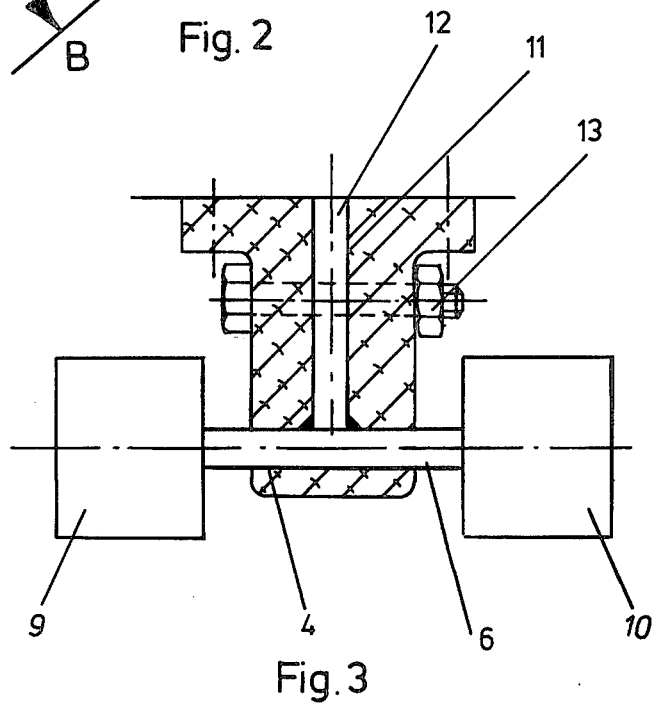
FIG. 3 is a sectional view of the supporting body of the skateboard taken along the plane B—B in FIG. 2.
Figure 6:
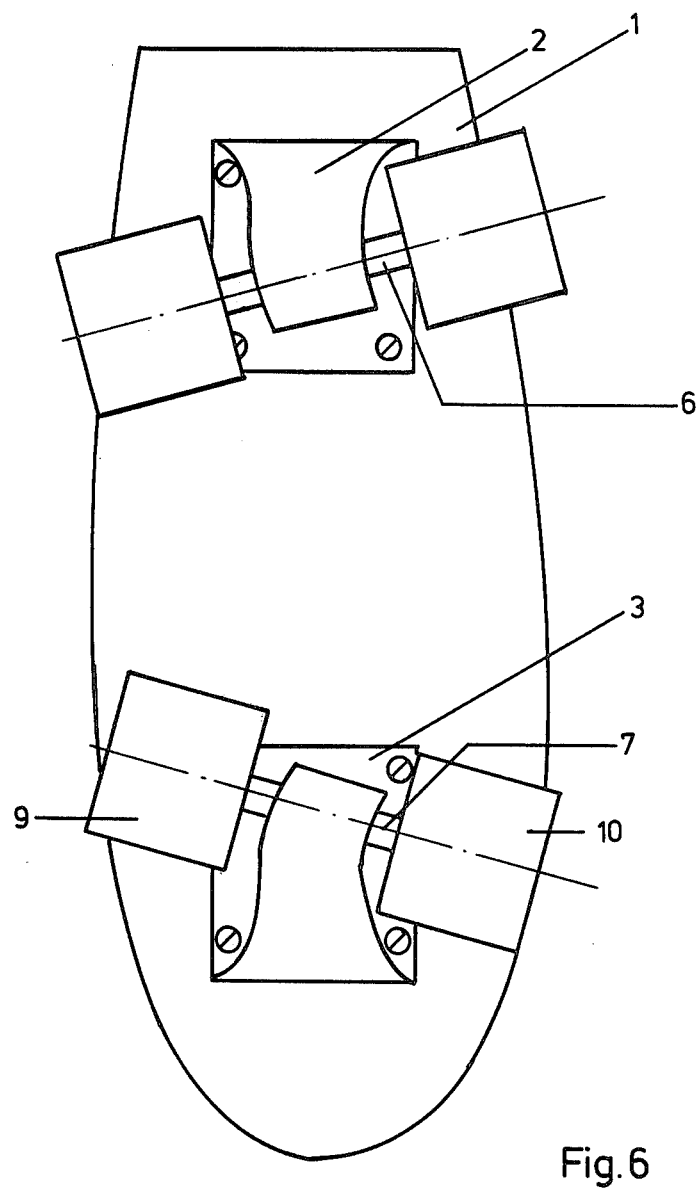
FIG. 6 is a bottom plan view of the loaded skateboard.

The arrangement of the pin 12 and its particular position make it possible for the roller shaft 6, 7 to position itself relative to the mounting plate in accordance with the shift of weight by the user of the skateboard, as shown by way of example in FIGS. 4 to 6 which illustrate a support member 2 being deformed when the shaft 6 is inclined from its first or normal orientation shown in FIGS. 1-3 where the shaft appears parallel to the plane of plate 1. In FIGS. 4-6 a downward force has been applied to the left side of the plate 1, shaft 6 has been moved to a second orientation inclined relative to the first orientation and to the plate 1, support member 2 has been deformed, and pin 12 is partially rotated about its longitudinal axis. Due to the arrangement and position of the pin 12, the body weight of the user, when leaning to one side, causes an inclination of the shaft relative to the mounting plate as shown in FIGS. 4-6 and a rotation of the pin, which brings about a corresponding increase in the frictional force between the pin and the plastic supporting body. This causes a slight braking or retarding of the steering motion. Since this frictional force is proportionate to the body weight, the maneuverability will always be the same, regardless of the weight of the user.

This frictional bracing or controlled stiffening of the supporting body, and hence the maneuverability can, if desired, be controlled also by additional means. As is apparent from FIG. 3, a screw 13 which extends through the supporting body 2 or 3, in proximity to the bore 11 and pin 12, permits the material of construction of the supporting body 2 or 3 to be deformed in such a way that the frictional force between the pin 12 and the supporting body is increased.

Especially when stiffer materials of construction are used for the supporting body, it may be advisable to provide in a transverse surface of the supporting body one or more relief or cut-away portions 14 extending parallel to the roller shaft 6 or 7, respectively, that will make the supporting body more elastic and enable it to better absorb shocks, for example.

The present invention is not limited to the embodiment shown in the drawing, but other designs and modifications are possible within the scope of the underlying invention, and as defined in the appended claims, wherein the term "skating device" shall be intended to include skateboards, roller skates and the like.

What is claimed is:

1. A support member for each roller shaft of a skating device which includes a mounting plate and two of said roller shafts and rollers thereon, each of said support members being formed of plastic material and comprising an upper part securable to said mounting plate, a lower part to which is secured one of said roller shafts, and a pin which has one end rigidly joined to said roller shaft, extends through said support member between said upper and lower parts, and is stiffer than said support member, said support member comprising an injection molded member in which said joined pin and roller shaft are molded.

2. A support member according to claim 1 wherein said pin extends along a line that is inclined at an angle $\alpha$ relative to a reference axis extending perpendicular to said mounting plate.

3. A support member according to claim 2 wherein said angle $\alpha$ is an acute angle.

4. A support member according to claim 1 wherein said support member is elastic and wherein said pin extends at an acute angle to said mounting plate, said shaft is movable from a first orientation generally parallel to said mounting plate to a second orientation inclined thereto when a force is applied to said shaft, said inclination of said shaft causing partial rotation of said pin about the pin's longitudinal axis and elastic deformation of said support member, further inclination of said shaft and corresponding further rotation of said pin within said support member being frictionally retarded by a frictional force established therebetween when said pin is rotated while said support member is deformed, said support member further comprising adjusting means for increasing said frictional force between said pin and said support member.

5. A support member according to claim 1 wherein said support member is elastic and wherein said pin extends at an acute angle to said mounting plate, the mounting plate of said skating device has a top surface with a longitudinal axis and right and left sides thereof, and said rollers are situated below said right and left sides respectively, and wherein said shaft is movable from a first orientation generally parallel to said mounting plate to a second orientation inclined thereto when a downward force is applied on one of said right or left sides of said top surface, said inclination of said shaft causing partial rotation of said pin about the pin's longitudinal axis and elastic deformation of said support member, further inclination of said shaft and corresponding further rotation of said pin within said support member being frictionally retarded by a friction force established therebetween when said pin is rotated while said support member is deformed.

6. A support member according to claim 5 wherein said adjusting means comprises a threaded bolt extending through said support member generally near said pin, and a mating nut which is tightenable on the bolt to compress said support member.

7. A support member according to claim 1 wherein said roller shaft and pin are perpendicular.

8. A support member according to claim 1 wherein said mounting plate has a longitudinal axis and said support member is elastic and comprises at least one surface extending transversely with respect to said longitudinal axis, said support member further defining in said surface a relief recess extending generally parallel to said shaft for rendering said support member more elastic.

9. In a skating device which includes a mounting plate, two roller shafts and rollers thereon, and an elastic support member for each of said roller shafts, the improvement in combination therewith wherein each of said support members is formed of plastic material and comprises an upper part secured to said mounting plate, a lower part to which is secured one of said roller shafts, and a pin which has one end rigidly joined to said roller shaft, extends through said support member between said upper and lower parts, and has stiffness greater than that of said support member, said support member comprising an injection molded member in which said joined pin and roller shaft are molded.

10. A skating device according to claim 9 wherein said pin extends in each of said support members along a line that is inclined at an acute angle $\alpha$ relative to a reference axis extending perpendicular to said mounting plate.

11. A skating device according to claim 10 wherein said pin has top and bottom ends, the bottom end being joined to said roller shaft, and said top end located in said upper part of the support member near said mounting plate.

12. A skating device according to claim 9 wherein said roller shaft and pin are perpendicular.

13. In a skating device which includes a mounting plate with a longitudinal axis, two roller shafts parallel to each other, perpendicular to said axis and axially spaced apart, at least one roller on each shaft, and an elastic support member for each of said roller shafts, the improvement in combination therewith wherein each of said support members comprises an upper part secured to said mounting plate, a lower part to which is secured one of said roller shafts, and a pin which has one end rigidly joined to said roller shaft, extends through said support member between said upper and lower parts said pin and shaft at their intersection being completely enclosed by said support member, and has stiffness greater than that of said support member, at an acute angle to said mounting plate each of said roller shafts being movable from a first orientation generally parallel to said mounting plate to a second orientation inclined thereto when a force is applied to said shaft, said inclination of said shaft causing partial rotation of said pin about the pin's longitudinal axis and elastic deformation of said support member, further inclination of said shaft and corresponding further rotation of said pin within said support member being frictionally retarded by a frictional force established therebetween when said pin is rotated while said support member is deformed.

* * * * *

UNITED STATES PATENT AND TRADEMARK OFFICE
CERTIFICATE OF CORRECTION

PATENT NO. : 4,202,558
DATED : May 13, 1980
INVENTOR(S) : Armin Olschewski et al It is certified that error appears in the above-identified patent and that said Letters Patent are hereby corrected as shown below:

Column 4, line 52-53, omit "said pin and shaft at their intersection being completely enclosed by said support member" and insert --at an acute angle to said mounting plate--.

Column 4, line 54-55, omit "at an acute angle to said mounting plate" and insert --said pin and shaft at their intersection being completely enclosed by said support member--.

Signed and Sealed this

Twenty-first Day of October 1980

[SEAL]

Attest:

SIDNEY A. DIAMOND

Attesting Officer

Commissioner of Patents and Trademark